United States Patent [19]

Prakken

[11] Patent Number: 4,781,011

[45] Date of Patent: Nov. 1, 1988

[54] APPARATUS FOR PACKING FILLED BAGS IN BOXES

[76] Inventor: Bouwe Prakken, Spijkerlaan 9, 3471 Eg Kamerik, Netherlands

[21] Appl. No.: 82,556

[22] Filed: Aug. 7, 1987

[30] Foreign Application Priority Data

Aug. 13, 1986 [NL] Netherlands ......................... 8602061

[51] Int. Cl.⁴ ...................... B65B 35/40; B65B 35/32; B65B 35/44
[52] U.S. Cl. ....................................... 53/537; 53/538; 53/202; 53/247
[58] Field of Search ................. 53/534, 537, 538, 539, 53/260, 246, 247, 202

[56] References Cited

U.S. PATENT DOCUMENTS

| | | | |
|---|---|---|---|
| 3,027,697 | 4/1962 | Croasdale | 53/538 X |
| 3,224,549 | 12/1965 | Cella et al. | 53/538 X |
| 3,479,795 | 11/1969 | Martin | 53/202 X |
| 3,512,336 | 5/1970 | Rosecrans | 53/539 X |
| 3,641,735 | 2/1972 | Daily et al. | 53/537 |
| 3,869,843 | 3/1975 | Darrah, III et al. | 53/539 X |
| 3,893,282 | 7/1975 | Armbruster et al. | 53/537 X |
| 3,996,723 | 12/1976 | Greenwell | 53/537 X |
| 4,162,870 | 7/1979 | Storm | 53/247 X |
| 4,329,831 | 5/1982 | Warkentin et al. | 53/247 X |
| 4,660,352 | 4/1987 | Deines et al. | 53/247 X |

FOREIGN PATENT DOCUMENTS

| | | |
|---|---|---|
| 908619 | 8/1972 | Canada . |
| 1097893 | 1/1961 | Fed. Rep. of Germany . |
| 1109595 | 6/1961 | Fed. Rep. of Germany . |
| 1504339 | 10/1967 | France . |

Primary Examiner—Horace M. Culver
Attorney, Agent, or Firm—Watson, Cole, Grindle & Watson

[57] ABSTRACT

For packing filled bags into boxes an apparatus is provided which includes a receiving plate for collecting bags in a row, and a pusher plate for pushing the row to a position above a box to allow the row to fall into the box. To achieve an accurate positioning of the rows of bags in a box and a high degree of filling of the box a movable cassette is positioned above a waiting box. In order to bridge over the varying distance between the cassette and the receiving plate, a bridging plate extends between the cassette and the receiving plate. Preferably the bridging plate is in the form of a slide plate which is joined to the cassette.

10 Claims, 1 Drawing Sheet

APPARATUS FOR PACKING FILLED BAGS IN BOXES

BACKGROUND OF THE INVENTION

The invention relates to an apparatus for packing filled bags into boxes, which comprises collecting means for collecting a number of bags in a row, a conveyor for feeding boxes to a determined position, pusher means for pushing a row of formed bags to a position above a box thus positioned, and means for allowing the row of bags situated above a box to fall into the latter.

An apparatus of this kind is known from Canadian Pat. No. 908619.

Filled bags, for example bags filled with nuts, should generally be packed in slightly overlapping rows in boxes. This accurate positioning of rows of bags in a box to ensure that the desired overlapping is actually achieved and that the boxes are adequately filled is a problem with known machines if a high filling capacity is to be obtained. Each box is in fact moved in succession by the box conveyor into different receiving positions, while bags already present in the box are displaced in the latter because of the necessarily great acceleration of the box. This can impair the desired positioning of the bags in the box and also the desired degree of filling of the latter. Moreover, the known construction is complicated and easily damaged.

The invention seeks to obviate the above-mentioned disadvantages and to provide an apparatus with which, even with a high filling capacity, accurate positioning of the rows of bags in a box and thus the desired degree of filling of the boxes can be achieved.

SUMMARY OF THE INVENTION

According to the invention the apparatus is for this purpose characterized in that a cassette can be brought with the aid of hydraulic, pneumatic or mechanical positioning means into a number of positions above a waiting box, while a bridging device extends between the cassette and the collecting means in order to bridge over the varying distance between them.

The cassette, which is adapted to make a reciprocating movement, can be brought into a very accurate position above a box. A row of bags moved into the cassette by the pusher means will be received in the desired part of the box situated under the cassette.

The bridging device ensures that a series of collected bags can be received in the cassette irrespective of the position of the latter. In a simple preferred embodiment of the bridging device consists of a slide plate joined to the cassette and extending under the collecting means. However, it is also possible for the bridging device to consist of a conveyor belt moving at high speed, optionally of telescopic construction known per se in order to enable the length of the top part to be varied in dependence on the distance between the collecting means and the cassette. A conveyor belt of this kind will for example with the aid of carriers also be able to serve as pusher means.

The collecting means preferably consists of a belt conveyor having a telescopic discharge end part and a receiving plate.

In order to achieve a considerable increase of the capacity of the apparatus, collecting means, pusher means and a bridging device may be provided on two sides of the cassette, while control means are provided for operating in each case those pusher means which are disposed in front of the row of bags which is collected first. During the collection of one row of bags, a row which has already been collected can be pushed to the cassette. A counter determines which row is ready first and a signal is transmitted to the appertaining pusher means. In the event of the breakdown of one of the two feed means, the apparatus can continue to operate on the other side, although with reduced output. It may be observed that the known construction according to the abovementioned Canadian patent specification is not suitable for a double construction of this kind.

In order to be able to adapt the width of the cassette to the width of the filled bags, the cassette may consist of two parts movable relative to one another. In this case each cassette part may have a pivotable bottom flap in the form of a toothed part.

The invention will now be explained in greater detail with the aid of the drawings, which illustrate two embodiments thereof.

DETAILED DESCRIPTION OF THE PREFERRED EMBODIMENTS

Figure 1:
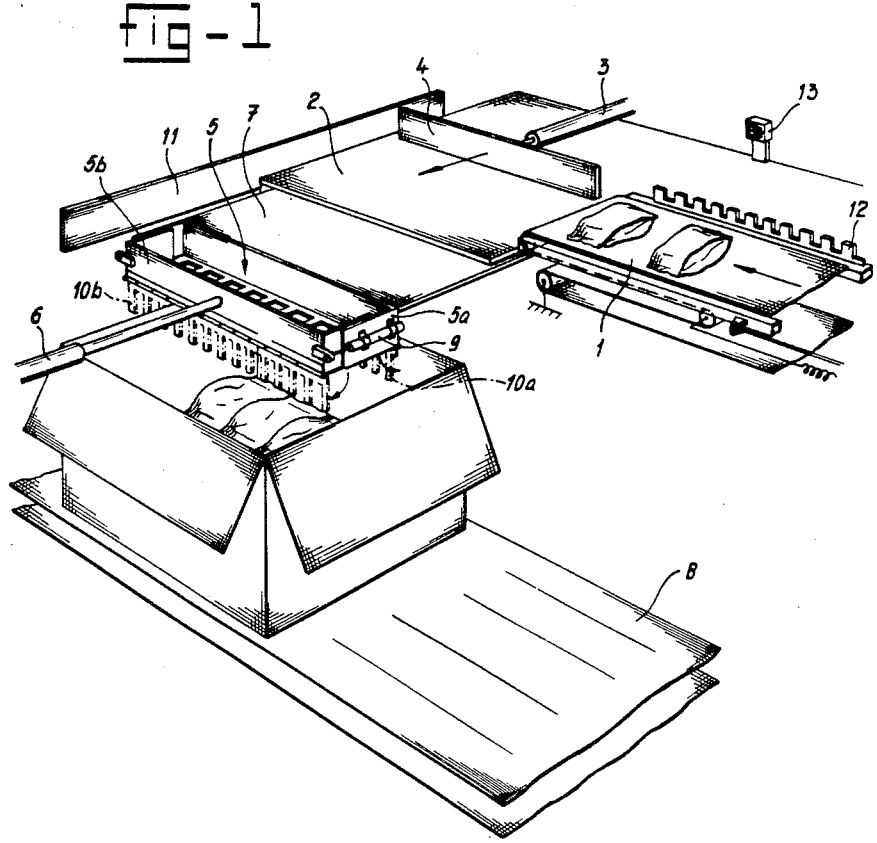
FIG. 1 is a view in perspective of a first embodiment.

Both embodiments are intended for packing bags filled with a product, for example nuts, in rows in a box in such a manner that the bags in a row and the rows themselves partly overlap and that the maximum degree of filling is achieved.

The bags are first collected in a row. The collecting means suitable for the purpose consist in the embodiment shown in FIG. 1 of a conveyor belt 1 having a telescopic discharge end, and a receiving plate 2. The discharge end of the belt deposits the arriving bags on the plate 2 in such a manner that the bags overlap in a row lying on the plate 2. As soon as the desired number has been deposited on the plate 2 by the returning discharge end of the belt 1, a hydraulic or pneumatic cylinder 3 is operated to push forward a pusher plate 4.

A cassette 5 is situated some distance from the receiving plate 2 and is adapted to be moved between a number of positions by means of a hydraulic or pneumatic cylinder 6. Instead of this cylinder it is also possible to position the cassette by using a positioning device driven by an electric motor.

A slide plate 7 bridges the space between the receiving plate 2 and the cassette 5. The slide plate 7 is joined to the cassette 5. A conveyor belt 8 for feeding boxes is provided under the cassette 5.

The cassette 5 consists of two halves 5a, 5b, which are adapted to be moved towards and away from each other by means of a hydraulic or pneumatic cylinder 9. The width of the cassette can thus be adapted to the width of the filled bags. Each cassette part 5a, 5b has a pivotable bottom flap 10a and 10b respectively, which by means of a hydraulic or pneumatic cylinder (not shown) or other means can be pivoted between a position in which the bottom flaps form a floor and an outwardly pivoted position. The bottom flaps 10a, 10b are provided with fingers with gaps between them. In the position in which they form a floor, a finger of one flap will in each case be engaged in a gap between two fingers of the other flap.

In order to deposit a row of collected bags in the box, the row will be given a push by the pusher device 4 and thus the row will slide over the plate 7 and arrive in the cassette. The cassette occupies a precise position above the box, so that on the opening of the bottom flaps 10a, 10b the row of bags will fall into a determined position in the box. After a row of bags has dropped into the box, the flaps 10a, 10b are brought into the closed position, and at the same time the cassette is moved a distance slightly smaller than the width of a bag. The procedure of depositing a row of bags in the box via the cassette is repeated. The rows of bags will thus come to lie in the box in positions such that they partly overlap, which is important for an adequate degree of filling of the box, In addition, it is also possible for the cassette not to have a bottom and for the row of bags to start their falling movement into the box as soon as they slide into the cassette.

In addition to the cassette and the slide plate a holding plate 11 is also shown in the drawing.

The most important advantages of the construction are that the cassette can be brought into the desired position above the box, while the bridging plate 7 moving with the cassette and the pusher means 3, 4 ensure that a row of bags will be received in the cassette whatever the position of the latter. The pusher means 3, 4 must impart an adequate initial speed to the row of bags.

Figure 2:
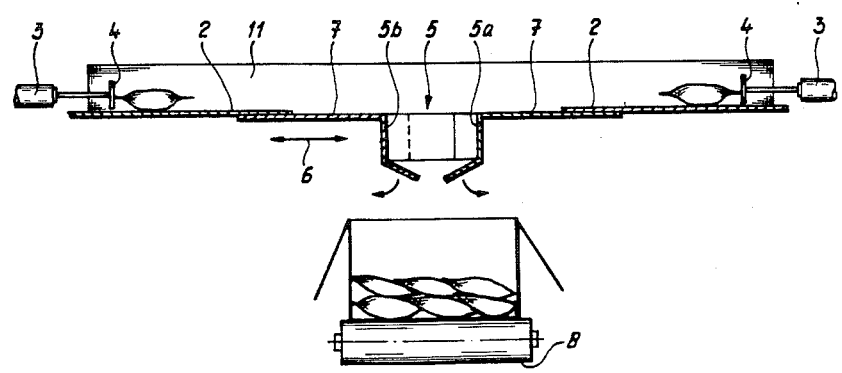
FIG. 2 is a schematic cross-section of the second embodiment of the invention.

Means must be added to ensure that the cylinder 3 is operated only if the telescopic discharge end of the conveyor 1 is outside the range of the pushing zone of the pusher plate 4 and the desired number of bags has been deposited on the plate 2. In FIG. 1 a toothed strip 12 is fastened to the telescopic discharge end, while a fixed photocell light source 13 determines the number of teeth passing it. The control means control the displacement of the discharge end of the conveyor belt 1 and the cylinder 3, so that the bags are deposited in a row with accurate overlapping, and the cylinder 3 is operated when the adjusted number of bags per row has been deposited on the plate 2. Control and monitoring means are also provided which ensure that the cylidner 3 is operated only if the cassette assumes the correct position above the box. In the embodiment shown more schematically in FIG. 2 components which correspond to those in the embodiment shown in FIG. 1 are given the same reference numerals. The difference in relation to FIG. 1 is that pusher means 3, 4, a receving plate 2, and a bridging device 7 joined to the cassette are disposed on both sides of the reciprocatingly movable cassette 5 (the cylinder 6 is omitted for the sake of clarity). The capacity of the apparatus can thus be substantially increased. In normal full operation a row of bags collected on the one receiving plate 2 will be moved into the cassette and deposited in the box by way of the latter, while on the other receiving plate 2 a row of bags is being collected. In this case the two pusher means 3, 4 operate alternately. However, the counting and control means (not shown) will be so programmed that if a breakdown or delay in the collection of bags occurs on one side of the cassette, while the other side is still operable, the pusher means on the other side will operate twice or more times in succession, that is to say without alternating with the pusher means on the first-mentioned side. In principle the programming will adopt the rule that the first complete row of bags counted will be the first to be deposited in the box via the cassette.

As already state, it is possible for the cassette to be constructed without a bottom. If the cassette does have a bottom, the latter may comprise a horizontally removable plate in addition to the pivotable flaps shown in the drawings.

The most important advantages of the apparatus according to the invention are that the box can be very compactly filled because of the accurate positioning of the cassette above the box (the bags overlap to some extent), and the apparatus can have a high filling capacity.

Various modifications are possible within the scope of the invention. There are various possible ways, known per se, for the collection of the bags in a row. The pusher means could consist of a belt conveyor provided with carriers and moving in the direction of the cassette, while the collection means must then of course be able to transfer a collected row of bags to the belt conveyor equipped with carriers. It is possible for the bridging device to consist of a high-speed belt conveyor. With the aid of its carriers this belt must also be able to serve as pusher means. The length of the top part of the belt should be variable in dependence on the distance between the cassette and the collecting means, with the aid of a telescopic construction known per se while the bottom part of the belt is guided reciprocatingly over two rollers.

For the operation of the apparatus according to the invention it is essential that a predetermined number of bags should then be collected in a row, that a push should be given to this row to move it via a bridgin device into a cassette accurately positioned above a box and to introduce it into the box by way of the cassette, while the bridging device moves together with the reciprocatingly movable cassette.

I claim:

1. In an apparatus for packing filled bags into boxes which comprises a first receiving means, a first conveyor means for providing a row of overlapping filled bags on said first receiving means, a filled bag drip means, a second conveyor means for sequentially moving boxes beneath said filled bag drop means, and first pusher means for pushing a row of filled bags from said first receiving means to said filled bag drop means such that the row of filled bags will fall into a box positioned therebelow, the improvement wherein said drop means comprises a cassette means into which said row of filled bags can fall, a first bridging means extending from said cassette means to said first receiving means, and positioning means for moving said cassette means and said first bridging means towards and away from said first receiving means, thus determining where said row of filled bags falls into said box.

2. Apparatus according to claim 1, wherein said first bridging means is a slide plate which is joined to said cassette means and extends under said first receiving means.

3. Apparatus according to claim 1, wherein said first conveyor means consists of a belt conveyor having a telescopic discharge end.

4. Apparatus according to claim 1, wherein control means is provided for controlling the operation of said pusher means based on the number of filled bags provided on said first receiving means by said first conveyor means.

5. Apparatus according to claim 1, wherein said cassette means consists of two parts which are movable relative to each other.

6. Apparatus according to claim 5, wherein each cassette part has a pivotable bottom flap in the form of a toothed element.

7. Apparatus according to claim 5, including means to move said two parts towards and away from one another.

8. Apparatus according to claim 1, wherein said first pusher means comprises a pusher plate and a drive cylinder attached thereto.

9. Apparatus according to claim 1, wherein said positioning means comprises a drive cylinder.

10. Apparatus according to calim 1, including a second receiving means positioned on the opposite side of said cassette means from said first receiving means, a third conveyor means for providing a row of overlapping filled bags on said second receiving means, a second pusher means for pushing a row of filled bags from said second receiving means to said filled bag drop means, and a second bridging means extending from said cassette means to said second receiving means.

* * * * *